(12) United States Patent
Schumacher et al.

(10) Patent No.: US 6,908,578 B2
(45) Date of Patent: Jun. 21, 2005

(54) FOAM APPLICATION BY AN APPARATUS FOR TWO-DIMENSIONAL TRAVEL

(75) Inventors: Wolfgang Schumacher, Neubiberg (DE); Peter Dimperl, Deining (DE)

(73) Assignee: Siempelkamp Handling Systeme, Munich (DE)

( * ) Notice: Subject to any disclaimer, the term of this patent is extended or adjusted under 35 U.S.C. 154(b) by 399 days.

(21) Appl. No.: 09/827,633

(22) Filed: Apr. 6, 2001

(65) Prior Publication Data

US 2001/0028125 A1 Oct. 11, 2001

(30) Foreign Application Priority Data

Apr. 11, 2000 (EP) .............................................. 00107724

(51) Int. Cl.[7] .............................................. B29C 44/20
(52) U.S. Cl. ..................................... 264/45.8; 264/46.5
(58) Field of Search ................................. 264/45.8, 46.5

(56) References Cited

U.S. PATENT DOCUMENTS

| | | | | |
|---|---|---|---|---|
| 3,954,544 A | * | 5/1976 | Hooker | ........................ 156/356 |
| 4,196,160 A | * | 4/1980 | Sperry | ........................ 264/40.4 |
| 4,239,564 A | * | 12/1980 | Krumweide | .................. 156/79 |
| 4,270,889 A | * | 6/1981 | Hoffmann et al. | .......... 425/115 |
| 4,559,003 A | * | 12/1985 | Poncet | ........................ 425/224 |
| 4,581,186 A | * | 4/1986 | Larson | ........................ 264/45.8 |
| 4,614,013 A | * | 9/1986 | Stevenson | .................. 264/46.7 |
| 5,505,812 A | | 4/1996 | Mortoly et al. | |
| 5,569,439 A | | 10/1996 | Cardini et al. | |
| 5,587,182 A | * | 12/1996 | Sulzbach et al. | ............ 425/4 L |
| 5,665,287 A | * | 9/1997 | Fiorentini et al. | ............ 264/53 |
| 5,714,099 A | | 2/1998 | Merser | |

FOREIGN PATENT DOCUMENTS

| | | | |
|---|---|---|---|
| EP | 0 510 407 | * 10/1992 | |
| EP | 0 992 291 A2 | 4/2000 | |
| FR | 745904 | * 4/1970 | ................ 264/45.8 |
| WO | WO 97/33732 | 9/1997 | |

* cited by examiner

Primary Examiner—Allan R. Kuhns
(74) Attorney, Agent, or Firm—Wood, Phillips, Katz, Clark & Mortimer

(57) ABSTRACT

The invention relates to the production of foamed sandwich elements including skins joined by a frame. In applying the foam in a cassette formed by the frame and one of the skins the invention provides for use of an applicator having a two-dimensional movable discharge orifice.

13 Claims, 3 Drawing Sheets

FOAM APPLICATION BY AN APPARATUS FOR TWO-DIMENSIONAL TRAVEL

BACKGROUND OF THE INVENTION

The present invention relates to the production of so-called sandwich elements comprising two skins including a frame connecting the skins in an outer edge portion, and a filler material sandwiched inbetween.

PRIOR ART

It is known in producing such sandwich elements to apply the foam, or also a liquid reactant later reacting into the foam, into a cassette comprising the lower skin and the frame, the cassette being open to the top to thus allow an applicator, having a discharge orifice, to be located above the panel opening of the cassette. It is understood that the terms "lower" and "upper" shall not be interpreted to limitate the sandwich element itself in any way, these terms merely serving to distinguish the skin already belonging to the cassette, prior to application of the foam or liquid reactant, from the other skin.

After application of the foam, or its liquid reactant, the cassette is accordingly joined to the upper skin. Generally, the foam is allowed to totally react with the cassette closed, it usually being necessary to define the distance between the skins by clamping in a corresponding device, so that the foam does not force the skins and thus the sandwich element apart.

It is furthermore known to move the cassette, when applying the foam or liquid reactant, longitudinally by a conveyor means, the applicator with the discharge orifice being moved so that the foam is distributed in the cassette transversely. It is understood that the longitudinal direction and transverse direction are not necessarily the direction of greatest length of the cassette and the direction perpendicular thereto in the plane of the skins. Instead, the longitudinal direction is defined by the direction of movement of the conveyor means and the transverse direction is oriented substantially perpendicular thereto in the plane of the lower skin. Furthermore, it is not a mandatory requirement that the application or discharge orifice itself are moved in the transverse direction. Instead, it is also sufficient when the direction in which the foam or liquid reactant are expelled from the discharge orifice is changed, such that the desired transverse distribution of the foam on the lower skin is achieved.

It is understood that in the claims the term "foam" is intended to cover any finished foam or liquid reacting thereinto.

WO 97/33732 discloses a method and an apparatus for applying adhesive cement to furniture panels and for cementing mirrors or frames thereto. In this arrangement, an applicator is designed for travelling in two directions. During cementing and pressing mirror and frame together, the furniture panels are set secured immovable.

EP 0 992 291 A2 of later publication relates to a method of applying adhesive cement to shoe soles.

U.S. Pat. No. 5,569,439 relates to applying resin to motor coils, which are moved on a longitudinally conveyor, the applicator means being transversely adjustable and able to deviate from the coils longitudinally.

U.S. Pat. No. 5,714,099 relates to applying an adhesive cement to strengthening ribs of construction boards. In this arrangement, an applicator is provided for movement in one direction, the board remaining clamped in place.

In conclusion, U.S. Pat. No. 5,505,812 relates to coating strips of wood with adhesive cement prior to the production of laminated boards with the aid of a wide roll, wetted with the adhesive cement.

SUMMARY OF THE INVENTION

It is on the basis of this prior art that the invention is based on the technical object of defining a method of producing the sandwich element, which, as regards application of the foam or its liquid reactant into the cassette, is an improvement.

In accordance with the invention, this object is achieved by the applicator with the discharge orifice being moved two-dimensionally, whereby one direction of movement corresponds to the transverse direction and the other direction of movement corresponds to the longitudinal direction.

The invention is based on prior art hitherto merely teaching one-dimensional movement of the applicator with the discharge orifice, i.e. travel transversely or pivotally in a rotary plane, in achieving transverse distribution. Principally, this is also sufficient, since the second longitudinal direction, with the transverse direction clamping the plane of the lower skin, is already provided by the movement of the cassette, or in the conveyor means. In addition, the conventional approach is not only sufficient, it is also the simplest design solution.

The invention is based, however, on having discovered that the additional complication in design, for permitting movement of the applicator with the discharge orifice two-dimensionally, is more than worthwhile by it enhancing flexibility and boosting performance, in that better results are now achievable, in many cases, both technically and as regards the production costs involved. In accordance with the invention applying the foam or the liquid reactant is now namely independent of the conveyed movement of the cassette so that a wide variety of application patterns is achievable, and ideal solutions are to be found in optimizing the uniformity of the application and the time needed for application.

The term "two-dimensional" in this context is also to be understood, generally, as also including pivotal movements or combinations of a pivotal movement in one direction and a translatory movement in another direction.

Preferably, however, a translatory movement is involved in at least one of the directions, preferably in both. For this purpose, it is not necessary that the translatory movement in the transverse direction covers the entire width of the cassette in this direction. Instead, due to an edge point of the movement being exceeded by the material in being expelled from the discharge orifice, as prompted by a corresponding fast change in speed, i.e. flinging of the expelled material during its falling movement, the width of application, as compared to the actual distance of the translatory movement, is substantially increased. The same applies to a combination of a translatory movement with changes in the expelling direction of the material. Analogously, the length of application in the longitudinal direction may also be longer than the actual travel of the translatory movement of the applicator in this direction. As regards details thereof, reference is made to a separate European patent pending under file No. 99 120 792 and the disclosure content thereof.

Preferably the production system in accordance with the invention is designed so that the two-dimensional movement is programmable via a graphics movement controller, also permitting programming of the opening and closing phases of the applicator, in optimizing adaptation of the system to the special features of various sandwich elements.

The performance of the method in accordance with the invention is furthermore enhanced by making use of two applicators in parallel, each provided with a discharge orifice. In this arrangement, one of the applicators may be conventional, i.e. movable in one direction only, whilst the other achieves the invention. Preferred, however, is two-dimensional movement of both applicators, each programmable independent of the other, so that the applicators are able to cover the webs or surface areas involved dividingly in minimizing total application time. This applies principally, of course, also for special cases requiring more than two applicators.

The invention relates more particularly to PUR/PIR foam application and liquid reactants associated therewith, i.e. reaction mixtures foaming into PUR/PIR foam following application to the lower skin. The invention relates furthermore, in particular, to sandwich-type door elements, whereby the lower and upper skin form the exposed surfaces areas of the door, or receive further coatings therefor, whilst the sandwiched space is foamed. The facing and side edges of the door are then formed generally by the frame.

As already mentioned, it is especially when the width and/or length of application within a cassette are not uniform, i.e. not forming a simple continuous rectangle needing to be foamed, that applications of the invention become particularly of interest. For example, an opening may be provided in the sandwich element or only in its foam layer, e.g. for a lock or a window in the case of a door, requiring the portion provided for the opening not to be including in foaming. In such a situation, the production sequence can now be optimized by optimally exploiting the two-dimensional movement, especially where two independent applicators are involved. Thus, contrary to conventional prior art, there is now no or less need to use a closed phase for the applicator, i.e. an unproductive phase in foaming, when such an opening portion is covered. Instead, e.g. first one edge portion on one side of the opening, and then the other edge portion on the other side, can be covered, which is only possible in a two-dimensional movement. Where two applicators are provided, the one can be used to cover the one remaining strip and the other for the other remaining strips, or the one applicator can cover both remaining strips, whilst the other applicator simultaneously foams another part of the cassette.

It is understood that the invention is directed at both the corresponding method of production and a production system devised suitable therefor and thus the following description of the invention, including the example embodiments, are to be understood as features disclosing the method both explicitly and implicitly, as well as the device.

The invention provides, furthermore, for the applicator comprising a recirculating mixer head of self-cleaning design; so that even in the closing phases, e.g. in being moved from one portion of the surface area to be foamed to another, in making use of fast-reacting materials having short starting times, no difficulties are experienced with the applicator, this applying likewise to a situation involving two or more applicators.

It is more particularly in the production of the PUR/PIR foam sandwich elements, e.g. for doors, as already mentioned, that the invention is located preferably upstream of the input to a double-belt system provided for height- and thermally-controlled final reaction of the foam.

As regards the further embodiments, reference is made to the claims 12 to 14.

BRIEF DESCRIPTION OF THE DRAWINGS

For a better understanding of the invention—whereby it is understood, that the individual features disclosed may also be essential to the invention in combinations other than those as shown—an example embodiment will now be detailled, with reference to the drawings, in which.

DETAILED DESCRIPTION

Figure 1:
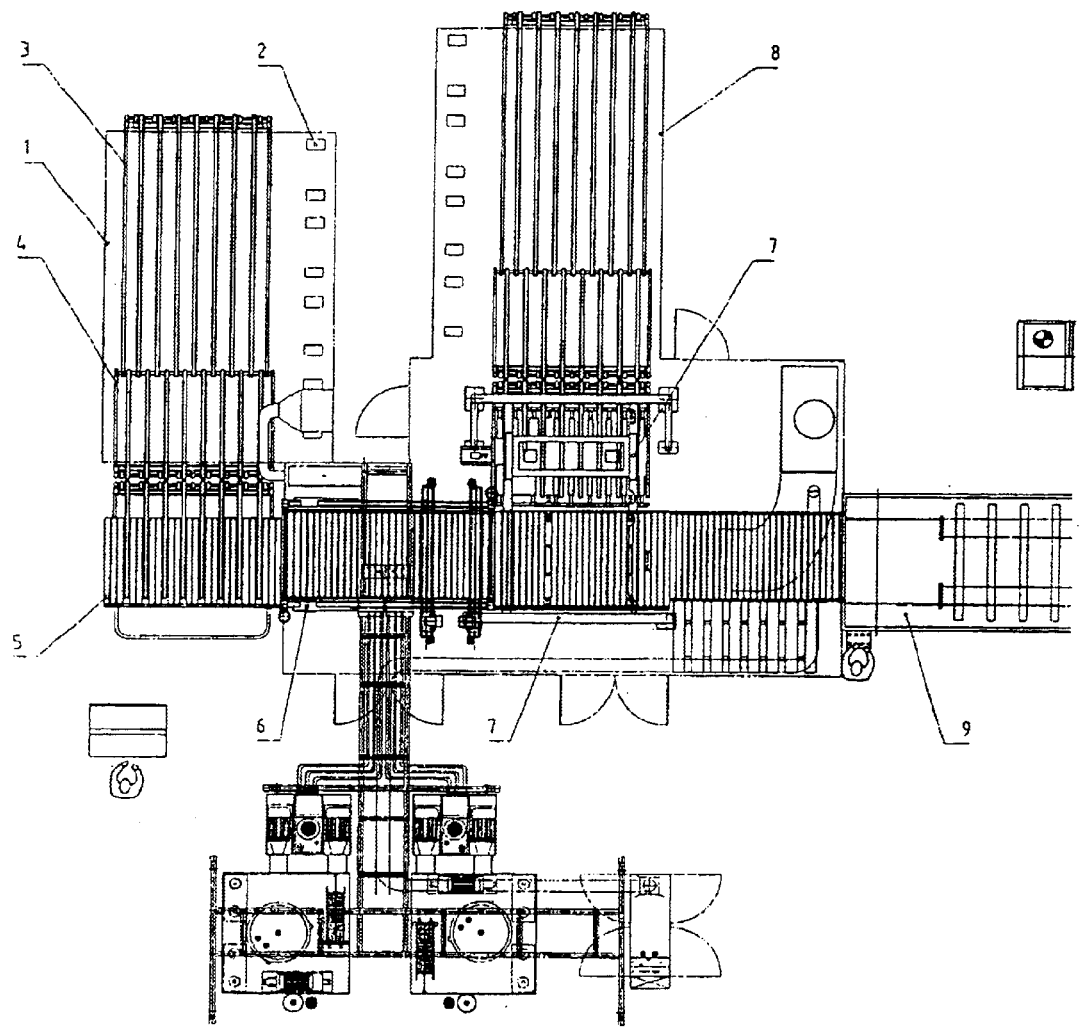
FIG. 1 is a plan view of part of a production system for sandwich elements by the method in accordance with the invention.

Referring now to FIG. 1 there is illustrated part of a sandwich element production system as viewed from above. This system, in employing the method in accordance with the invention, produce sandwich door elements consisting of two panel-type skins joined by a frame in the outer portion. A PUR/PIR (polyurethane/polyisocyanurate)foam is jetted into the volume defined by the skins and the frame. The present invention relates to this procedure.

For a better overview, the steps involved upstream and dowstream of the part in accordance with the invention will first be summarized. Reference numeral 1 as shown in FIG. 1 summarizes an inline oven including a belt conveyor means divided into a first segment 3 and a second segment 4, it being into this inline oven 1 that prefabricated cassettes comprising a lower skin already joined to the frame are loaded by ways and means not detained in the present. Since the cassettes are transported and processed individually, the production system in accordance with the invention is also suitable for processing a "mixed bunch" of different types of cassette.

Figure 2:
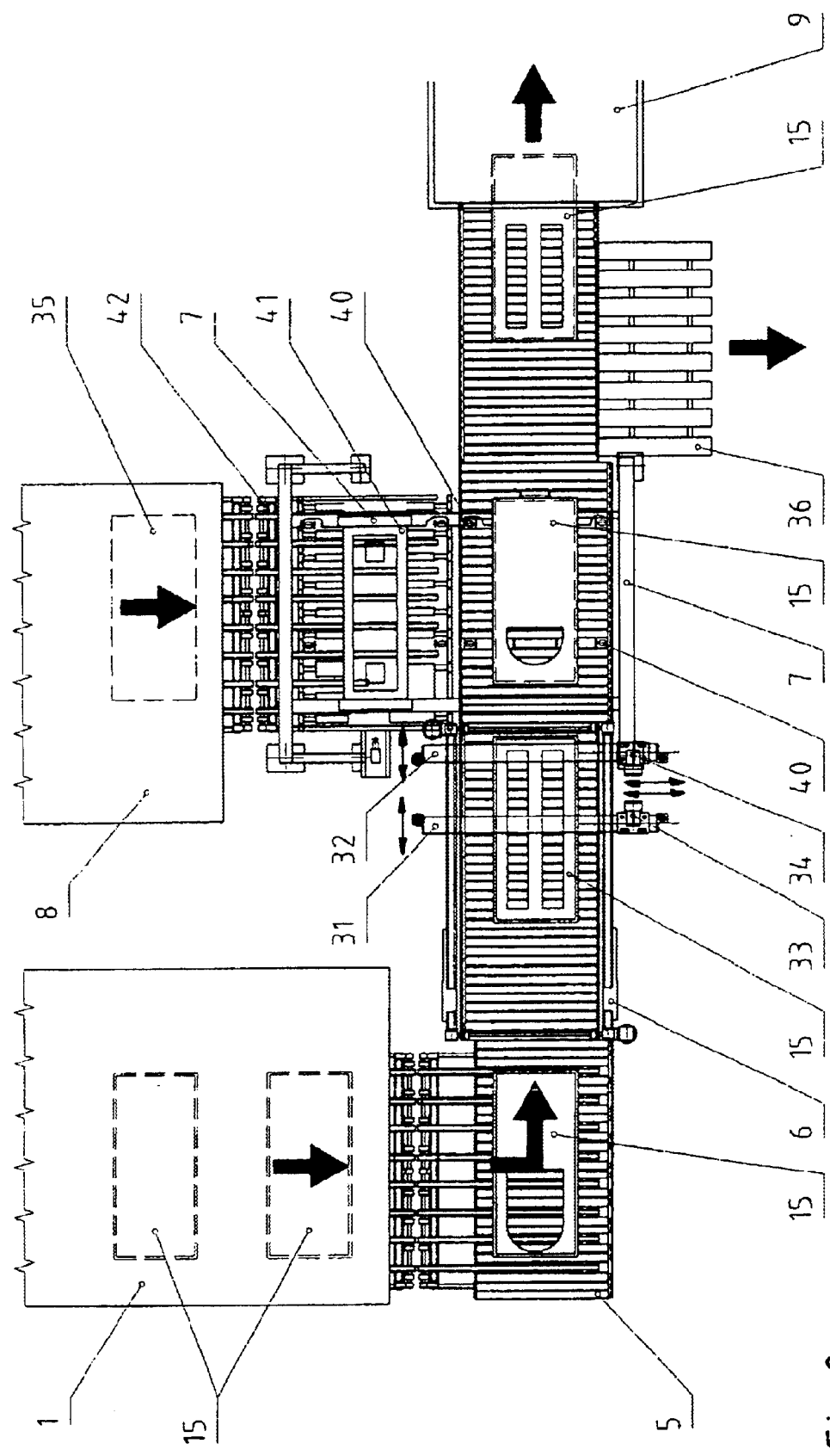
FIG. 2 is a sectional view including the part of the production system as shown in FIG. 1 important to the method in accordance with the invention.

The cassettes are heated in the inline oven 1 to a prescribed processing temperature, achieved at the outlet of the oven, where the second segment 4 of the conveyor means transfers the cassettes to a roller conveyor means 5 working transversely thereto, i.e. with the aid of a further belt conveyor means communicating with the portion of the roller conveyor means 5 between the rollers, i.e. with a so-called angle station (cf. also cassettes 15 as shown in FIG. 2 to be detailled later).

The details of the method for heating up the cassettes in the inline oven 1 are the subject matter of an application EP 00 107 720.5 by the same assignee entitled "Preheating System with Power Reduction on Operational Interruptions" to which reference is made and the disclosure content of which is understood to be included in the present application. Substantially, the novelty involved in the inline oven consists of it being divided into zones, each operable separately and capable of setting a special temperature profile, should transport be interrupted, due to a fault in the system. This temperature profile is designed so that the temperatures existing at the various zones in the inline oven 1, correspond to the actual temperature development of the cassettes in smooth throughput, thus avoiding the cassettes being overheated, when the transport is reinstated. For further details, reference is made to the cited parallel patent application.

As already mentioned, one such preheated cassette is run into the foaming station 6, illustrated merely as suggested in FIG. 1, and which is detained in the scope of the present application. It is in this foaming station 6 that the cassettes are charged with a reactant mix for a PUR/PIR foam as expelled from two recirculating mixer heads of a double portal system. Starting the reaction of the reactant mix into the PUR/PIR foam is enhanced as a function of the processing temperature of the cassette generated by the inline oven 1, in taking into account the material compositions and also the heat-loss of the cassette on its way from the inline oven 1 to the foaming station 6.

With the aid of the roller conveyor means 5, the foamed cassettes are forwarded from the foaming station 6 into an automatic engaging device 7 including a vacuum suction cart.

This automatic engaging device 7, too, is illustrated merely suggested, details of which are to be found likewise in patent application EP 00 107 721.3 of the same assignee entitled "Powered Engaging of Sandwich Elements", to the disclosure content of which reference is again made herein. In this automatic engaging device 7 preheated skin elements are clipped to the cassette filled with the reactant mix with the vacuum suction cart in a further inline oven 8. In this arrangement, the automatic engaging device 7 first holds the skin inclined to engage a latching means on one side between cassette and upper skin before then clipping a further latching means to the other side by flat placement of the upper skin against the cassette, whereby the second latching means is relieved by a horizontal movement which flexibly deflects the first latching means somewhat.

The inner configuration of the second inline oven 8 corresponds to that of the first inline oven 1. It is to be noted that the temperature at which the upper skin is processed is also important for satisfactory final reaction of the PUR/PIR foam.

From the automatic engaging device 7 the now closed sandwich element is transported by the roller conveyor means further into a conventional double-belt system 9, indicated merely diagrammatically, in which the PUR/PIR foam finally reacts, whereby the double-belt system 9 sets the spacing of the two skins and thus the thickness of the finished sandwich element. Furthermore, the double-belt system 9 provides for suitable thermal control, i.e. preheating the cassette and the upper skin in the inline ovens 1 and 8, thermal control of the reactant mix expelled from the recirculating mixer heads and, in conclusion, thermal control of the double-belt system 9 are all important in combination for a satisfactory processing sequence.

Figure 3:
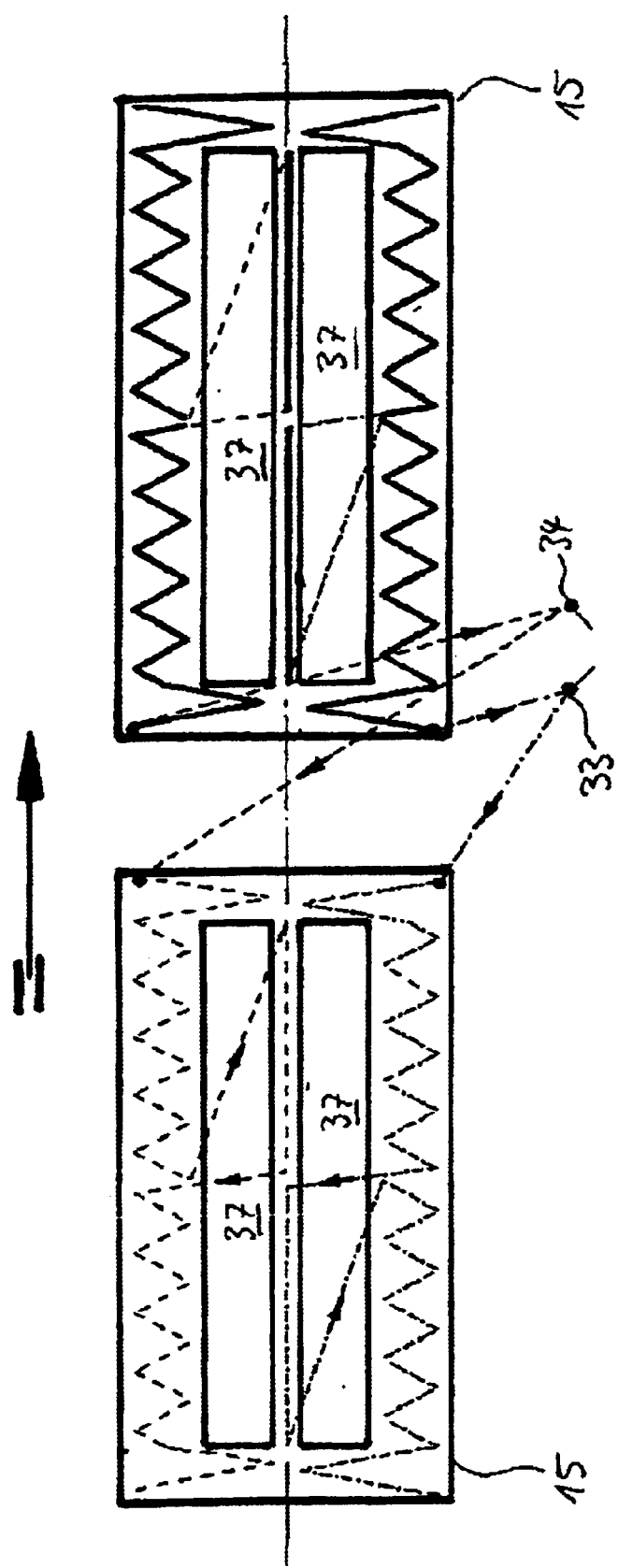
FIG. 3 is a diagrammatic illustration of the possibilities in directing the mixer heads of a foaming station as shown in FIGS. 1 and 2 above a cassette of a typical sandwich element.

Referring now to FIGS. 2 and 3 the configuration and functioning of the foaming station 6 will be detailled. FIG. 2 shows the middle zone of FIG. 1 in more detail on a magnified scale. Firstly indicated in FIG. 2 are several cassettes 15, i.e. as indicated in the inline oven 1 during preheating and furthermore along the path formed by the roller conveyor means 5 from the angle station at the output of the inline oven 1 to the double-belt system 9. Indicated furthermore in the cassettes on the roller conveyor means 5 are opening structures which will be later detailed with reference to FIG. 3. Indicated in conclusion, in the inline oven 8 is an upper skin 35 for clip attachment by the automatic engaging device 7 to a cassette 15 following foam application in the foaming station 6.

The arrows indicate the direction of movement in transporting the cassettes 15 and the upper skin 35 in the various zones. It is to be noted, however, that the arrow indicated in the bottom portion of FIG. 2 on the right for a means identified by reference numeral 36 does not represent a normal transport procedure, it instead standing for manual side ejection of reject elements from production. For this purpose, transport rollers of the ejection means 36 can be elevated in the region of the roller conveyor means 5 between the rollers thereof, to which the transport rollers are oriented crosswise, so that a sandwich element located thereon can be removed to one side from the roller conveyor means 5 via the ejection means 36.

Indicated in the region of the foaming station 6 of main interest in this zone are two portals 31 and 32 which, as indicated by the arrows, can be moved forwards and backwards in the transport direction of the cassettes 15. It is to be noted that the powered movement of the portals 31 and 32 is provided each independent of the other. In this arrangement, the travel extends practically to the angle station located upstream of the output of the inline oven 1 and thus corresponds to at least the maximum length of the cassettes 15 to be foamed. The travel ends at the right in FIG. 2, where the right-hand portal 32 is indicated in its basic position. It will readily be appreciated, of course, that the portal shown on the right in FIG. 2 cannot be travelled totally to the left-hand end of the travel, and vice-versa, the left-hand portal 31 as shown on the left in FIG. 2 cannot be travelled totally to the right-hand end, but only up to the basic position as indicated, since the portals 31 and 32 stand in the way in the edge portions.

Each of the portals 31 and 32 carries on its upper crossbeam a mixer head 33 and 34 respectively for travelling along the same (likewise indicated by arrows). The mixer heads 33 and 34 are self-cleaning recirculating mixer heads in which a plunger is travelled and which in one position brings together reactant mix components emerging from individual supply lines and permits expelling thereof mixed in a smooth flow, but which in the other position connects the supply lines to return lines so that the reactant components are recirculated without being mixed. It is this configuration that permits the recirculation mixer heads 33 and 34 to be rapidly switched ON/OFF, whereby in the OFF phase the outlet passage in the mixer heads is cleaned of reactact mix remainders by the aforementioned plunger whilst practically preventing "dribbling" of the foam mix. These mixer heads were employed hitherto in PU processing mainly in classic discontinuous molding and not on double-belt systems.

Travelling the recirculating mixer heads 33 and 34 along the crossbeams of the portals 31 and 32 is also provided for each mixer head independent of the other. Accordingly, the recirculating mixer heads 33 and 34 permit two-dimensional travelling in the region of the foaming station 6, this applying only with the limitation of each being independent of the other, that in this example embodiment the portal 31 is always located upstream, i.e. on the left of portal 32 as shown in FIG. 2, although, of course, other embodiments are conceivable, in which this limitation does not apply, i.e. permitting one portal to be run past under the other, this requiring, however, one of the mixer heads to make a brief interruption in operation.

Referring now to FIG. 3 there is illustrated the cassette 15, located in the region of the foaming station 6, as shown in FIG. 2, twice juxtaposed. In this arrangement, FIG. 3 serves to illustrate advantageous travel arrangements of the mixer heads 33 and 34, whereby the basic position of the mixer heads 33 and 34 as indicated in FIG. 2 is signified dotted and identified by the reference numerals 33 and 34. The dot-dashed line identifies the travel of the mixer head 33, whilst the broken line identifies the travel of the mixer head 34. In this arrangement, the arrows indicate the direction and thus also the sequencing of the individual travel elements. Indicated on the right is the cassette 15 with the mixer heads having already executed the travel paths, the solid lines representing the already foamed trace, so that distances pointing to, as well as from, the ends of these travel paths to the basic position represent the end of the foaming procedure for this cassette 15 and the return to the basic position.

The arrows pointing away from the basic position somewhat further to the left represent, by contrast, the start of the foaming procedure. It is to be noted in this respect that the travel paths in FIG. 3 are indicated relative to the referencing systems formed by the moving cassette 15, i.e. FIG. 3 showing graphically the lines actually travelled by the cassette 15. These are programmable in a graphics movement controller of the foaming station 6 as graphic lines, as shown in FIG. 3. In this arrangement, however, the graphics movement controller takes into account the movement of the cassette 15 on the roller conveyor means 5 so that the lines as indicated in FIG. 3 are slightly compressed relative to the non-moving environment in the transverse direction of FIG. 3, i.e. the transport direction of the cassette 15.

FIG. 3 makes it clear that due to the two-dimensional movement capability, on the one hand, the use of two mixer head 33 and 34 each permitting travel independent of the other, on the other, as well as due to the optimum lines being freely graphics-programmable, foaming is now possible optimized both in time economy and as regards the uniformity of foam application. This applies more particularly to the cassettes 15 as illustrated, in which the openings 37, as indicated, are provided. It is understood that the portion of the distance moved by the mixer heads 33 and 34 passing through these openings 37 is travelled with the mixer head closed, i.e. with no foam application (see broken and dot-dashed lines on the right-hand side) for which the fast switching permitted by the recirculating mixer heads, as described, is of advantage. However, this two-dimensional travel capability is also basically of advantage for cassettes having no openings, since this permits greater freedom in programming the line geometry to be travelled. It is this line geometry that is of major significance for the uniformity in foaming out the cassettes 15.

It is understood that the person skilled in the art will find the lines in the geometry best suited for individual cassettes 15 and openings 37 differing in shape. Significant in this respect is, on the one hand, the uniformity of foam application and, on the other, quickest-possible movement sequence so that the cassettes 15 can be run through the foaming station 6 as fast as possible, the speed in this example embodiment being, for example, 21 meters/min.

What is claimed is:

1. A method of producing a sandwich element comprising a lower and an upper skin, a frame joining the skins in an outer portion and a foam between the skins and within the frame comprising the steps of:

applying said foam from a discharge orifice of an applicator into a cassette open to the top, comprising said lower skin and said frame, said cassette then being joined to said upper skin, thereby conveying said cassette by a conveyor means in a longitudinal direction and moving said applicator with said discharge orifice so that said foam is distributed in a transverse direction, wherein said applicator with said discharge orifice is moved two-dimensionally, one direction corresponding to said direction of transverse movement and the other direction corresponding to a direction of longitudinal movement in order to optimize a two-dimensional distribution of said foam within said cassette in that said foam application follows said two-dimensional movement of said discharge orifice.

2. The method as set forth in claim 1 wherein said movement corresponding to said transverse direction is a translatory movement in said transverse direction.

3. The method as set forth in claim 2 wherein said movement corresponding to said longitudinal direction is a translatory movement in said longitudinal direction.

4. The method as set forth in claim 1 wherein said two-dimensional movement is programmable as a graphic line defined relative to said cassette, whereby also closing phases of said applicator are programmable.

5. The method as set forth in claim 1 wherein a second applicator having a second discharge orifice is provided.

6. The method as set forth in claim 5 wherein said second applicator is moved two-dimensionally substantially independent of said first applicator.

7. The method as set forth in claim 1 wherein said foam is a reactant mix reacting into a PUR/PIR foam.

8. The method as set forth in claim 1 wherein said sandwich element is a door element.

9. The method as set forth in claim 1 wherein said sandwich element comprises an opening of said foam layer and the portion corresponding to said opening is bypassed in application of said foam.

10. The method as set forth in claim 1 wherein said applicator(s) comprise(s) a self-cleaning recirculating mixer head.

11. The method as set forth in claim 1 wherein said cassette joined to said upper skin is introduced into a double-belt system.

12. The method as set forth in claim 1 wherein said cassette prior to application of said foam is conveyed and heated in an inline oven with the aid of a conveyor means over an oven length so that said cassette at the end of said oven length attains a processing temperature, said inline oven being divided into a plurality of oven zones passed through by said cassette and each oven zone being operated, in the case of a temporary interruption in operation and thus standstill of said conveyor means, at such an individually reduced temperature that said cassette waiting in said oven zone retains substantially a zone waiting temperature substantially corresponding to the temperature of a cassette in said oven zone under normal operating conditions, so that when normal operation is reinstated said cassette are subjected to no substantial overheating above said prescribed process temperature.

13. The method as set forth in claim 1 wherein after application of said foam, latching means of said upper skin and of said frame of said cassette are caused to engage at least two opposite outer edges of said sandwich element formed by said skins and said frame with said filling so that said frame and said upper skin are joined, said latching means being powered into engagement by an automatic engaging device and said automatic engaging device in a relative inclined position of said upper skin and cassette first engaging said latching means on one of said two edges before then in maintaining this engagement translating said inclined position into a flat position, whereby in producing said flat position said latching means is caused to engage the other of said two sides.

* * * * *